(12) United States Patent
France-Prouvoste

(10) Patent No.: US 9,031,940 B2
(45) Date of Patent: *May 12, 2015

(54) METHOD, SYSTEM AND APPARATUS FOR DYNAMIC REGISTRY OF BOOKS AND FOR MODELING REAL-TIME MARKET DEMAND FOR BOOKS WITHIN ACADEMIC SECTORS

(71) Applicant: Katherine Lynn France-Prouvoste, New York, NY (US)

(72) Inventor: Katherine Lynn France-Prouvoste, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,349

(22) Filed: Sep. 13, 2013

(65) Prior Publication Data

US 2014/0019475 A1 Jan. 16, 2014

Related U.S. Application Data

(63) Continuation of application No. 13/562,914, filed on Jul. 31, 2012, now Pat. No. 8,548,993, which is a continuation of application No. 11/845,325, filed on Aug. 27, 2007, now Pat. No. 8,260,776.

(60) Provisional application No. 60/840,622, filed on Aug. 28, 2006.

(51) Int. Cl.
*G06F 17/30* (2006.01)
*G06Q 30/02* (2012.01)
*G06Q 50/20* (2012.01)

(52) U.S. Cl.
CPC .......... *G06F 17/30477* (2013.01); *G06Q 30/02* (2013.01); *G06Q 50/20* (2013.01); *G06F 17/30864* (2013.01)

(58) Field of Classification Search
CPC ................................................ G06F 17/30864
USPC ................ 707/726, 731, 748, 769, 792, 802; 434/118, 185, 350
See application file for complete search history.

(56) References Cited

U.S. PATENT DOCUMENTS

| | | | |
|---|---|---|---|
| 6,915,286 B2 | 7/2005 | Policastro et al. | |
| 6,953,344 B2 | 10/2005 | Shafrir | |
| 7,003,474 B2 | 2/2006 | Lidow | |
| 7,266,340 B2 | 9/2007 | Bresciani | |
| 7,512,627 B2 | 3/2009 | Hossfeld et al. | |
| 8,187,004 B1 * | 5/2012 | Desensi et al. | 434/365 |
| 8,272,874 B2 * | 9/2012 | Julia et al. | 434/185 |
| 8,275,305 B2 * | 9/2012 | Hutchinson et al. | 434/350 |
| 8,332,398 B2 | 12/2012 | Sasai et al. | |
| 8,385,810 B2 * | 2/2013 | Nolasco | 434/350 |

(Continued)

OTHER PUBLICATIONS

Backlist to the Future by Rachel Donadio, Jul. 30, 2006.

(Continued)

*Primary Examiner* — Jay Morrison
*Assistant Examiner* — Dangelino Gortayo
(74) *Attorney, Agent, or Firm* — The Dobrusin Law Firm, PC

(57) ABSTRACT

A system provides a connection between education administration, particularly as such administration assigns or selects books, and the marketing and use of those books. Such marketing and use of those books and information related to those books can include, without limitation, consumer product information, the publishing industry and specifically book publishing, and market analysis, analysis of data, markets, demand and supply chain and inventory management.

20 Claims, 4 Drawing Sheets

(56) References Cited

U.S. PATENT DOCUMENTS

| | | |
|---|---|---|
| 8,632,340 B1 * | 1/2014 | Schugren et al. ............ 434/118 |
| 2002/0052808 A1 | 5/2002 | Sekihata et al. |
| 2004/0033475 A1 | 2/2004 | Mizuma et al. |
| 2004/0098280 A1 | 5/2004 | Hubert |
| 2005/0086257 A1 | 4/2005 | Wright |
| 2006/0010064 A1 | 1/2006 | Noriega et al. |
| 2006/0036460 A1 | 2/2006 | Gibbons et al. |
| 2006/0149616 A1 | 7/2006 | Hildick-Smith |
| 2006/0155656 A1 | 7/2006 | Kreder, III et al. |
| 2006/0172274 A1 | 8/2006 | Nolasco |
| 2006/0252022 A1 | 11/2006 | Douglas |
| 2007/0202482 A1 | 8/2007 | Mark et al. |
| 2008/0015890 A1 | 1/2008 | Malyala |

OTHER PUBLICATIONS

Promotional Intelligence by Rachel Donadio, May 21, 2006.
A Cozy Book Club, in a Virtual Reading Room by Anne Eisenberg, Mar. 4, 2007.
History, Digitized (and Abriged) by Kate Hafner, Mar. 11, 2007.
The Great Mystery: Making a bestseller by Shira Boss, May 13, 2007.

* cited by examiner

Figure 3

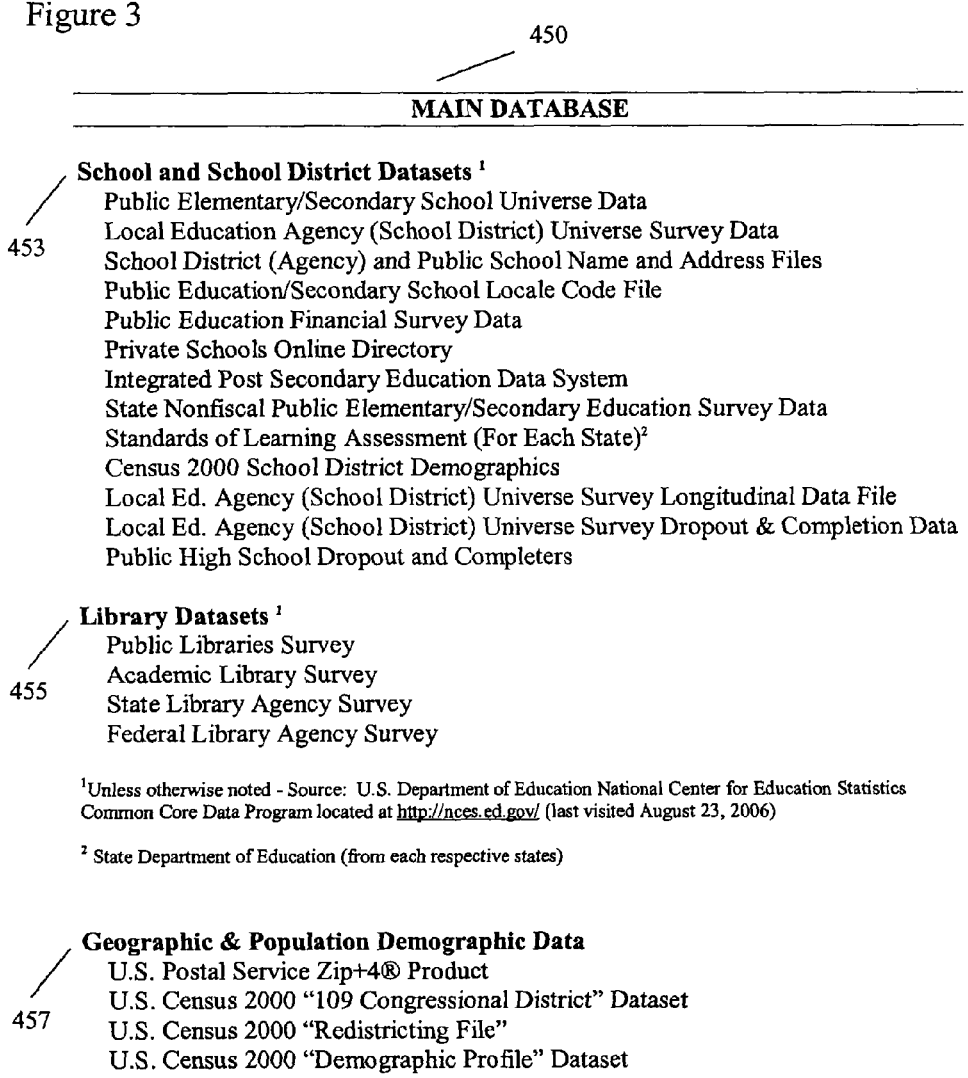

MAIN DATABASE

School and School District Datasets [1]  (453)
Public Elementary/Secondary School Universe Data
Local Education Agency (School District) Universe Survey Data
School District (Agency) and Public School Name and Address Files
Public Education/Secondary School Locale Code File
Public Education Financial Survey Data
Private Schools Online Directory
Integrated Post Secondary Education Data System
State Nonfiscal Public Elementary/Secondary Education Survey Data
Standards of Learning Assessment (For Each State) [2]
Census 2000 School District Demographics
Local Ed. Agency (School District) Universe Survey Longitudinal Data File
Local Ed. Agency (School District) Universe Survey Dropout & Completion Data
Public High School Dropout and Completers

Library Datasets [1]  (455)
Public Libraries Survey
Academic Library Survey
State Library Agency Survey
Federal Library Agency Survey

[1] Unless otherwise noted - Source: U.S. Department of Education National Center for Education Statistics Common Core Data Program located at http://nces.ed.gov/ (last visited August 23, 2006)

[2] State Department of Education (from each respective states)

Geographic & Population Demographic Data  (457)
U.S. Postal Service Zip+4® Product
U.S. Census 2000 "109 Congressional District" Dataset
U.S. Census 2000 "Redistricting File"
U.S. Census 2000 "Demographic Profile" Dataset

METHOD, SYSTEM AND APPARATUS FOR DYNAMIC REGISTRY OF BOOKS AND FOR MODELING REAL-TIME MARKET DEMAND FOR BOOKS WITHIN ACADEMIC SECTORS

This application is a continuation of application Ser. No. 13/562,914 (U.S. Pat. No. 8,548,993), filed Jul. 31, 2012, which is a continuation of Ser. No. 11/845,325 (U.S. Pat. No. 8,260,776), filed Aug. 27, 2007, which claims the benefit of Provisional Application Ser. No. 60/840,622 filed Aug. 28, 2006, the contents of which are incorporated by reference herein.

CLAIM OF PRIORITY

This application claims the benefit of the filing date of U.S. Provisional Application No. 60/840,622 filed Aug. 28, 2006.

FIELD OF INVENTION

This invention relates to education administration such as public and private elementary, secondary and postsecondary education, literacy, learning environments, combinations thereof or the like. The invention relates more particularly to the provision of a connection between education administration in relation to books, which the administration assigns or selects, and the marketing and use of those books and information related to those books, which can include, without limitation, consumer product information, the publishing industry and specifically book publishing, and market analysis, analysis of data, markets, demand and supply chain and inventory management.

BACKGROUND OF THE INVENTION

Every year state and local education agencies establish and promote reading assignments such as particular book assignments, summer assignments and associated summer reading requirements. These reading based assignments are endorsed for a variety of reasons such as combating summer learning loss, parental involvement initiatives or in response to public laws most notably the No Child Left Behind Act of 2001. Often, the reading assignments are planned in conjunction with classroom assignments scheduled for an academic time period (e.g., for classes the following academic year or semester). Moreover, it can be the case that students' fulfillment of these assignments (e.g., summer reading assignments) and students' readiness to discuss these assignments may not be optional. School administrators are experiencing increased pressure to "show" results of improved achievement. These pressures have transferred to educators, elementary and secondary school students and their parents and/or guardians. The education ecology has rapidly changed yet the resources and tools that support those involved to keep pace with those changes have been slower to evolve.

There are numerous inefficiencies within administrative systems to communicate requirements and guidance to members of the community. There are also numerous difficulties and obstacles members of the community encounter when attempting to respond to announced reading requirements.

One example has to do with a student and parent attempting to locate a required book. Ideally they may visit their local bookstore and immediately locate and purchase the required book. On many occasions, instead, the student and parent travel from bookstore to bookstore in search of a title for which 19 other classmates are in pursuit. The local bookstore's manager may be confronted with 15 disappointed consumers because the bookstore only had 5 copies of the required book in stock yet 20 students needed that particular book. The local bookstore may have lost those sales and perhaps future customers.

Further along the book supply chain, the distributor and publisher may be looking toward historic sales data to plan which books to produce and distribute, yet now many school districts are assigning, in addition to required books, a requirement that students read an additional book from a menu of selected titles. Traditional historic sales data would be used to forecast and manage inventory. Schools are doing business differently now which becomes disruptive to traditional business planning and decision making.

In addition, parents need tools that will assist them in making informed decisions regarding reading requirements and guidance and schools need tools that relieve administrative burden in effectively communicating, sharing information and knowledge with its immediate constituents (students, parents, faculty, staff and administrators) as well as the community at large such as bookstores, distributors and publishers who provide support for education in both direct and indirect ways.

Accordingly, there is a need for a method, system and apparatus that serves as a centralized clearinghouse that can efficiently collect, aggregate, process, recombine, present and disseminate in contextually appropriate forms, real-time information about books associated with curriculum requirements and guidance of education administrators such as public and private elementary, secondary and post secondary schools.

Thus, according to one aspect of the invention, a system is provided to remedy the difficulties, obstacles and inefficiencies encountered by several constituencies in need and/or pursuit of: data and contextual information; access to products, services and resources; information and knowledge sharing; conducting public policy and consumer research; development and administration of public policy; and, conducting trade, loan and commerce of products, services and resources as it relates to books associated with curriculum requirements and guidance of schools.

There are several additional or alternative aspect and/or advantages of this invention including:

a. providing delivery of a dynamic registry of books associated with curriculum requirements and guidance of schools for the benefit of the general public.

b. to provide the delivery of a dynamic registry of books associated with curriculum requirements and guidance of schools for the benefit of the businesses that would have a need or interest in this information.

c. to provide real-time market demand data for books.

d. to provide projected market demand data for books.

e. to provide historical market trend data related to books.

f. to provide consumer products information and serve as a consumer products information resource.

g. to serve as an education administration tool and resource.

h. to serve as a public education resource.

i. to provide a method, system and apparatus of promotion, sale and distribution of books and related information, products, services and resources.

j. to serve as a customer service management tool for business enterprises.

k. to serve as a supply chain management tool for business enterprises.

l. to serve as an inventory management tool for business enterprises.

m. to serve as a demand modeling tool for business enterprises.

n. to serve as a market analysis tool.

o. to serve as a research tool.

p. to serve as a dynamic registry of books.

q. to provide a method, system and apparatus for delivering the objects described above.

r. to provide a method, system and apparatus for modeling real-time, projected and historical market demand for books within the U.S. and international academic sectors.

s. to provide a method system and apparatus for modeling education achievement data.

Of course none of these aspects and/or advantages are necessarily required of the present invention unless otherwise stated. Further objects and advantages will become apparent from a consideration of the ensuing description and drawings.

SUMMARY OF THE INVENTION

The present invention provides a method, system and apparatus for the development, maintenance and delivery of a dynamic registry of books, related content and data associated with curriculum requirements and guidance of public and private elementary, secondary and post secondary schools in the United States, including, for example, U.S. Department of Defense and the Bureau of Indian Affairs elementary and secondary schools, and similarly situated schools in foreign countries. Additionally or alternatively, this invention can provide a method, system and apparatus for modeling contextually appropriate real-time, projected and historical market demand for books within the U.S. and international academic sectors.

The constituencies most likely to find relief and use in this invention can include any combination of the following: educators; students; parents and guardians of elementary and secondary school students; librarians affiliated with public and private libraries; the publishing industry at large and in particular book publishers, authors, booksellers and distributors; federal, state and local policy makers; researchers in the areas of public policy, sociology and consumer marketing; and the general public who have an interest in books and related content.

BRIEF DESCRIPTION OF THE DRAWINGS

Some preferred embodiments of the invention, including the best mode contemplated of carrying out and using the invention, will now be described in detail. Provided here is a list of the attached drawings related to the preferred embodiment of this invention.

FIG. 3 is a table of the datasets that comprise the system's main database.

DETAILED DESCRIPTION OF THE PREFERRED EMBODIMENT

The present invention relates to a computer implemented system that provides new mechanisms of information and knowledge sharing as it relates to books associated with curriculum requirements and guidance of public and private elementary, secondary and post secondary schools in the United States, including, for example U.S. Department of Defense and the Bureau of Indian Affairs elementary and secondary schools, and similarly situated schools in the United States or foreign countries. Simultaneously, the present invention relates to modeling real-time, projected and historical market demand for books within the U.S. and international academic sectors that are in formats contextually appropriate for a diverse audience of users. The present invention also relates the method of development, maintenance and delivery of the invented computer implemented system and resultant products.

Described here is the preferred embodiment of the method and system of the invention with reference to FIGS. 1, 2, 3 and 4.

Figure 1:
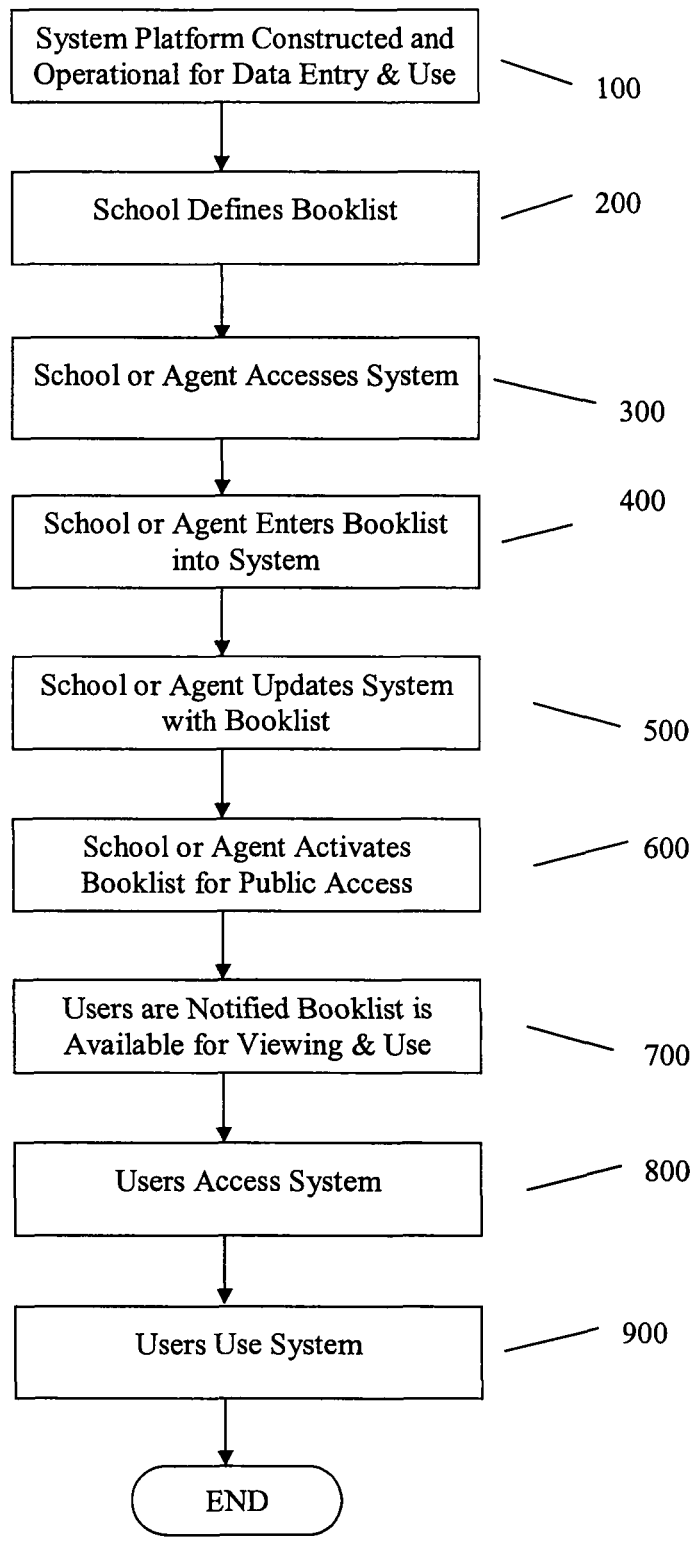
FIG. 1 is an overview of the steps involved in carrying out the method of development of the dynamic registry of books and system for modeling registry data as well as the delivery and use of the book registry and system.
Figure 2:
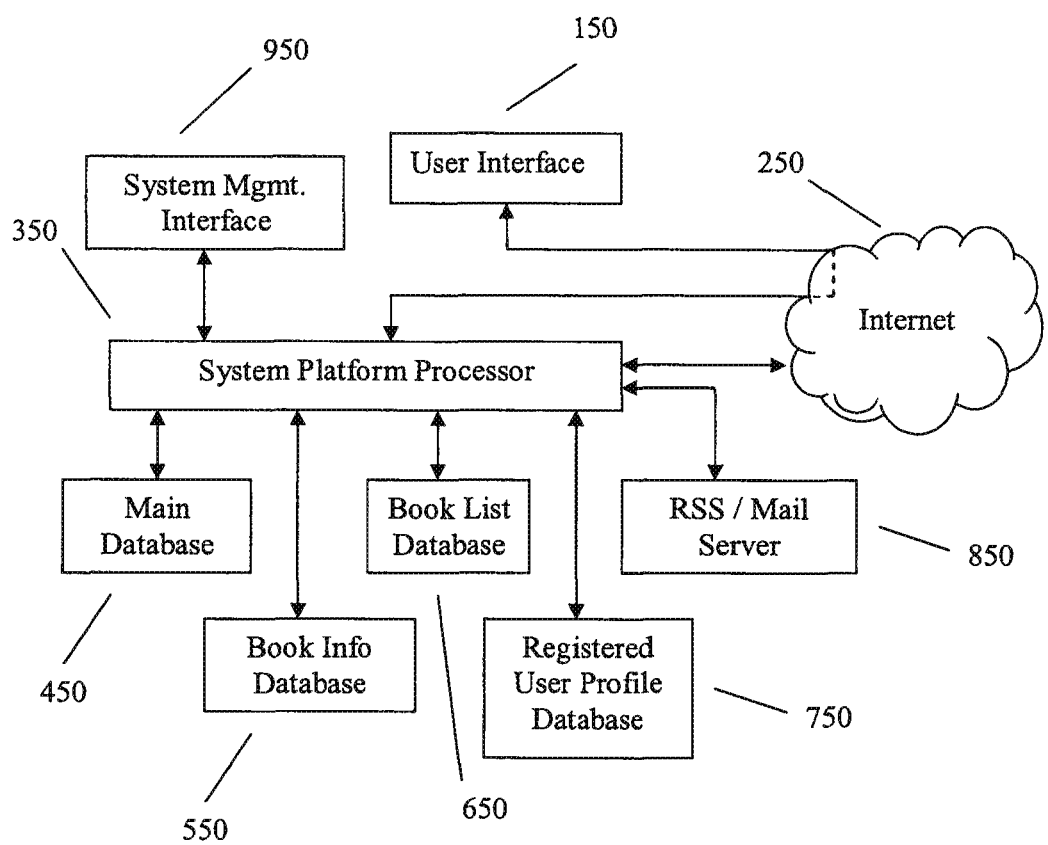
FIG. 2 is an overview of the system platform.
Figure 4:
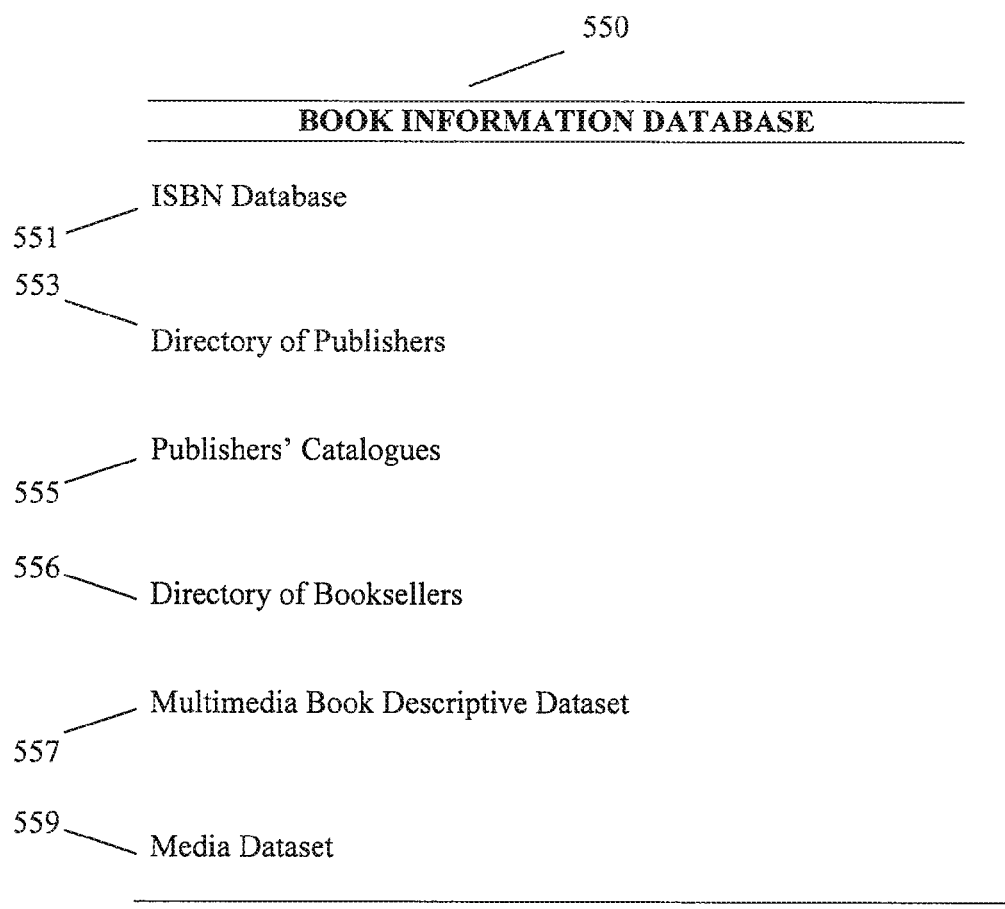
FIG. 4 is a table of the datasets that comprise the system's book information database.

FIG. 1 shows an overview of the steps involved in carrying out the method of development, delivery and use of the dynamic registry of books and system for modeling registry data. FIG. 2 shows an overview of the system platform (system). FIG. 3 shows the datasets that comprise the system's main database. FIG. 4 shows the datasets that comprise the system's book information database.

Referring to FIG. 1, in a preferred embodiment such as that shown in the drawing, the invention system platform (system) is constructed and operational 100. FIG. 2 shows an overview of the preferred embodiment of the system.

Referring to FIG. 2, the system is comprised of a system platform processor 350 which is the hub of the system and where all components and processing are connected and managed. Specific components of the system are the user interface 150 which connects to the system processor via the internet 250 or other digital transfer medium such a wireless (e.g., wireless phones). The system platform processor 350 also connects to the internet 250 and such connection can be separate and apart from the connection with the user interface 150. The system databases also connect through the system platform processor 350. System databases include the main database 450, the book information database 550, the book list database 650 and the registered user profile database 750. An electronic notification (RSS)/email server 850 is another component of the system and typically connects through the system platform processor 350. The system management interface 950 can connect directly to the system platform processor 350.

Referring to FIG. 3, the main database 450 is comprised of three categories of data. The first category is school and school district descriptive data 453 which includes databases containing descriptive information about schools such as public and private elementary, secondary and post secondary school. The information of these databases can be, at least in part, obtained from publicly available data products that are compiled by or on behalf of the U.S. Department of Education. Other data that can be included in the school district descriptive data category 453 are learning assessment datasets which are publicly available from state department of education agencies. The second category of data in the main database 450 the library descriptive datasets 455 which are publicly available databases that contain descriptive information about libraries. These databases are compiled by or on behalf of the U.S. Department of Education. The third category of datasets in the main database 450 is the geographic and demographic descriptive datasets 457 that profile U.S. populations within the context of geography. The information that comprises the geographic and demographic descriptive datasets 457 are publicly available from the U.S. Postal Service and U.S. Census Bureau.

Referring to FIG. 4, the book information database 550 is comprised of six datasets. The first dataset is the International Standard Book Numbers (ISBN) Database 551. The second dataset is a directory of publishers 553. The third dataset is a database of publishers' catalogues 555. The fourth dataset is a directory of booksellers 556. The fifth dataset is a multimedia database 557. The sixth dataset is a directory of media channels 559.

Referring to FIG. 1, school defines booklist 200. The school or agent then accesses the system 300 through the user interface 150 (FIG. 2). The school or agent enters book list into the system 400 through the user interface 150 (FIG. 2). Through the user interface 150 (FIG. 2), the school or agent then updates the system with the booklist 500. Next, the school or agent activates the booklist for public access 600. The users are notified the booklist is available for viewing and use 700. Users access system 800 through the user interface 150 (FIG. 2). Users use system 900 through the user interface 150 (FIG. 2).

In operation, described here is the preferred embodiment of the method and system of the invention with reference to FIGS. 1, 2, 3 and 4 as it is in operation.

FIG. 1 shows a simplified overview of the steps involved in carrying out the method of development, delivery and use of the dynamic registry of books and system for modeling registry data. FIG. 2 shows an overview of the system platform. FIG. 3 shows the datasets that comprise the system's main database. FIG. 4 shows the datasets that comprise the system's book information database.

Referring to FIG. 1, in a preferred embodiment such as that shown in the drawing, the invention system platform (system) is constructed and operational 100. Referring to FIG. 2, the system is comprised of a system platform processor 350 which is the hub of the system and where all components and processing are preferably connected and managed. A computer program manages the data input, processing, storage and output. The computer program manages the relational aspects of and among the system databases: the main database 450 (FIG. 2,3), the book information database 550 (FIG. 2,4), the book list database 650 and the registered user profile database 750. The computer program manages the messaging capabilities such as notification to users 700 (FIG. 1) and email via the RSS/Mail Server 850. The computer program enables the system processor to access the internet 250 to conduct search queries, gather and aggregate information and perform other computing routines. The computer program collects booklist data as it is entered by the school or agent 400 (FIG. 1) via the user interface 150 and then upon the school or agent updating the system with the booklist 500 (FIG. 1) the computer program updates the booklist to the booklist database 650. When the school or agent activates the booklist for public access 600 (FIG. 1) the computer program releases the information so that it will be displayed on the user interface 150 when a user accesses the system 800 (FIG. 1) and uses the system 900 (FIG. 1) where the information would be relevant and contextually appropriate for that particular user.

Still referring to FIG. 1, system platform constructed and operational for data entry and use 100, the main database 450 (FIG. 2,3) and the book information database 550 (FIG. 2,4) are assembled. The components of each of these databases are updated by its author at regular intervals and so as new versions of the component databases are released, each new version is used to update the main database 450 (FIG. 2,3) and the book information database 550 (FIG. 2,4). The booklist database 650 (FIG. 2) is a repository of data that contains a school identification field, an ISBN field, fields that collect whether the book is required or optional, a notes field and facility for documents to be uploaded in pdf form, xml, html or other formats. When an administrator (e.g. a school or agent) enters the booklist into the system 400 via the user interface 150 (FIG. 2) then enters the following data: the book's ISBN, indicates if the book is required or optional, notes related to the book and uploads any document that provides specific instruction with regard to the book and assignment. These items are cached and/or stored as drafts in the system processor 350 (FIG. 2) until the school or agent updates the system with the booklist 500 at which time the system processor updates the booklist database 650 (FIG. 2) with the information imputed and tags the data with the school's identification information matched from the main database 450 (FIG. 2, 3). The registered user profile database 750 (FIG. 2) facilitates a way for the system to recognize users that have particular functionality access to the system. For example, schools or agents who manage the input of booklists into the system will need to be identified as the administrator authorized by the school agency to manage its list in the system. The administrator will enter a user name and password into the user interface 150 (FIG. 2) to gain access to the system 300. The user name and password will be processed by the system platform processor 350 (FIG. 2). The system platform processor 350 (FIG. 2) will access the main database 450 (FIG. 2) and populate the user interface 150 (FIG. 2) with the corresponding school identification information. The school information and booklist details are bundled and updated to the booklist database 650 (FIG. 2) when the school or agent updates the system with the booklist 500—either in this same session or in a later session the school or agent activates the booklist for public access 600. When the system is updated, users are notified the booklist is available for viewing and use 700 via a message sent by the RSS/mail server 850 (FIG. 2). If users are registered to receive a notification when a particular school or group of schools have updated information (e.g., booklists) to the system, those users would receive an RSS notification and link to the booklist.

Referring to FIG. 2, the system may reside as a stand alone entity or integrated within a website. The user interface 150 allows users to enter and access booklists and related data and information. Access to booklist and related data utilizing the user interface 150 is possible without being a registered user. Schools and agents who access the system 300 (FIG. 1) to enter booklist data 400 (FIG. 1) or update booklist data 500 (FIG. 1) must be registered users as described above. If users wish to be notified a booklist is available 700 (FIG. 1) a "casual" registration level is required where the user would register their email address in a prompt field on the user interface 150.

Referring to FIG. 1, users use system 900. Enterprise users who wish to use the system data in relation to market analysis, inventory management, research and other modeling of system data will need a user registration similar to that of a school or agent.

It will be understood that the present invention is most likely a computerized system. For operating the system, the system platform will include one or more computer readable digital mediums such as computer hard drives or the like having programming for carrying out the transfer of data for the system. Moreover, the users, administrators, businesses and the like will be able to access the systems using computerized systems such as personal computers which will typically include visual displays that allow for interaction with the system.

The one or more computer readable mediums can include programming for retrieval of booklist data, programming for storing the booklist data, programming for notifying system users of the booklist data, programming for searching the booklist data or any combination thereof. The programming for retrieval of the booklist data can provide for entry of the booklist data into one or more fields by an administrator. The administrator is typically a school or agent thereof but could be any of the other entities (e.g., individuals) discussed herein unless otherwise specifically stated. The one or more fields can include an administrator identification field, an ISBN field, a field that indicates whether a book is required or optional, a notes field, a field indicating geography data related to the administrator or any combination thereof. In one embodiment, the administrator may be required to enter a user name and password to gain authorization to enter booklist data. The system may also provide for display of an administrator visual prompt upon a screen of a computer allowing the administrator to enter the booklist data into the one or more fields. The programming for storing the booklist data will typically provide for uploading of the booklist data to a booklist database. When present, the programming for notifying system users of the booklist data will typically be capable of initiating the sending messages to system users upon uploading of the booklist data to the booklist database. The system platform can include programming for providing for availability of the booklist data to system users on visual displays. Further, the programming for searching the booklist data may be capable of providing a visual prompt upon a visual display that allows for searching through search criteria indicative of the one or more fields. The system platform can also include programming that links books listed with the booklist data to information related to those books, such information including author information and book reviews.

It is also contemplated that the system and particularly the system platform processor 350 (FIG. 2) can provide the utility (e.g., be programmed) to automatically generate and execute search queries within and among the various datasets described on FIGS. 2, 3 and 4 and the internet 250 (FIG. 2). Further, the system platform processor 350 (FIG. 2) can also provide the utility (e.g., be programmed) for users and administrators to manually generate and execute search queries within and among the various datasets described on FIGS. 2, 3 and 4 and the internet 250 (FIG. 2). Results of search queries are typically visually displayed on either the user interface 150 (FIG. 2) or the System Management Interface 950 (FIG. 2).

Examples of Search Results

Such searching can provide a variety of results. It can provide for results that present information related to book availability from a variety of distribution channels based on geography relative to the user would be generated from a search query that combines book information such as the ISBN found in the book list database 650 (FIG. 2), geographic information 457 (FIG. 3), library datasets 455 (FIG. 3) and the internet 250 (FIG. 2). As another example, searching can provide results that present information related to the books listed on a booklist such as author information, reviews, audio, video, multimedia information and resources contextually related to the books topic, author, text and other criteria, news articles and resources from publishers, other media and more would be generated from a search query that combines ISBN data found in the book list database 650 (FIG. 2), ISBN data and metadata associated with the book found in the book information database 550 (FIG. 2, 4), geographic data 457 (FIG. 3) and the internet 250 (FIG. 2). As yet another example, searching can provide for results that present information related to other users who have been assigned similar books would be generated from a search query that combines data from the main database 450 (FIG. 2), book list database 650 (FIG. 2) and registered user profile database 750 (FIG. 2). As yet another example, searching can provide for results that present information related to achievement scores for further analysis to determine how certain books used in teaching affect achievement would be generated from a query that combines data from book list database 650 (FIG. 2), registered user profile database 750 (FIG. 2), school and district datasets 453 (FIG. 3). As still another example, searching can provide for results that present information related to modeling demand for books and the results can be generated from a search query that combines student population data and geographic data found in the main database 450 (FIG. 2), book information database 550 (FIG. 2,4) book list data found in the book list database 650 (FIG. 2), and registered user profile database 750 (FIG. 2).

Moreover, enterprise users would be able to view results from different perspectives based on geography, book title, author, publisher and other criteria. Enterprise users would also be able to link data via the internet 250 (FIG. 2) and process with their own proprietary inventory, production and distribution data. Enterprise users would also be able to export results from search queries to be used outside of the system.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A system for the dynamic registry of curriculum content, comprising:
   a main database comprised of the following categories of data:
   i) school and school district descriptive datasets;
   ii) state assessment datasets;
   iii) achievement score datasets;
   iv) library descriptive datasets; and
   v) geographic and demographic descriptive datasets;
   a system platform in role of proxy for administrator programmed to automatically manage the data input, processing, storage, and output, manage the relational aspects of and among the datasets, and generate and execute search queries within and among the datasets and the internet having one or more computer readable mediums that include programming for retrieval of book and other curriculum content data, programming for storing of the book and other curriculum content data, programming for notifying system users of the book and other curriculum content data, and programming for searching the book and other curriculum content data, or a combination thereof;
   wherein the system platform includes a system platform processor as the system hub;
   wherein the system platform includes a user interface through which:
   i) a computer program manages entry of the book and other curriculum content data into the system, including the following data:
   a) books' ISBN numbers;
   b) notes related to books, book specific information, and content and data associated with curriculum requirements and guidance;

ii) the computer program updates the system with the book and other curriculum content data; and iii) the computer program activates the book and other curriculum content data for public access;

a search function that provides results that present information related to achievement score data to determine how certain curriculum content used in teaching affects achievement, generated from a query that combines achievement score datasets, book and other curriculum content datasets, and school and school district descriptive datasets.

2. The system of claim 1, wherein:

i) the programming for retrieval of the book and other curriculum content data provides for entry of the book and other curriculum content data into one or more fields by a computer program that is enabled by the system platform processor to access the internet to conduct search queries and gather and aggregate information;

ii) the programming for storing of the book and other curriculum content data provides for uploading of the book and other curriculum content data to a book and other curriculum content database;

iii) the programming for notifying system users of the book and other curriculum content data sends messages to system users upon uploading of the book and other curriculum content data to the book and other curriculum content database; and iv) the programming for searching the book and other curriculum content data includes a public search function that provides curriculum content selection data by institution, student population data and geographic data, to generate curriculum content demand data.

3. The system of claim 1, wherein the user interface connects to the system platform via the internet.

4. The system of claim 1, wherein the user interface connects to the system platform via a wireless medium.

5. The system of claim 1, wherein the system resides as a stand-alone entity.

6. The system of claim 2, wherein the computer program manages the messaging capabilities such as notification to users and email via the RSS/Mail Server 850.

7. The system of claim 6, wherein the notifications to users are accessed via a wireless medium.

8. The system of claim 1, wherein the system platform includes a user interface for generating curriculum content demand data using the book and other curriculum content data, book selection data by institution, geographic data, and student population data via a wireless medium.

9. The system of claim 1, wherein the system platform facilitates use of the user interface to link data via the internet and process a user's proprietary inventory, production and distribution data.

10. The system of claim 1, wherein the book and other curriculum content data originates from a school.

11. The system of claim 1, wherein the book and other curriculum content data originates from individual users who access the system.

12. A system the dynamic registry of curriculum content, comprising:

a main database comprised of the following categories of data:

i) school and school district descriptive datasets;

ii) state assessment datasets;

iii) achievement score datasets;

iv) library descriptive datasets; and v) geographic and demographic descriptive datasets;

a system platform in role of proxy for administrator programmed to automatically manage the data input, processing, storage, and output, manage the relational aspects of and among the datasets, and generate and execute search queries within and among the datasets and the internet having one or more computer readable mediums that include programming for retrieval of book and other curriculum content data, programming for storing of the book and other curriculum content data, programming for notifying system users of the book and other curriculum content data, and programming for searching the book and other curriculum content data;

wherein the system platform includes a system platform processor as the system hub;

wherein:

i) the programming for retrieval of the book and other curriculum content data provides for entry of the book and other curriculum content data into one or more fields by a computer program that is enabled by the system platform processor to access the internet to conduct search queries and gather and aggregate information;

ii) the programming for storing of the book and other curriculum content data provides for uploading of the book and other curriculum content data to a book and other curriculum content database;

iii) the programming for notifying system users of the book and other curriculum content data sends messages to system users upon uploading of the book and other curriculum content data to the book and other curriculum content database; and iv) the programming for searching the book and other curriculum content data includes a public search function that provides curriculum content selection data by institution, student population data and geographic data, to generate curriculum content demand data;

wherein the system platform includes a user interface through which:

i) the computer program manages entry of the book and other curriculum content data into the system, including the following data:

a) books' ISBN numbers;

b) notes related to books, book specific information, and content and data associated with curriculum requirements and guidance;

ii) the computer program updates the system with the book and other curriculum content data; and iii) the computer program activates the book and other curriculum content data for public access;

a search function that provides results that present information related to achievement score data to determine how certain curriculum content used in teaching affects achievement, generated from a query that combines achievement score datasets, book and other curriculum content datasets, and school and school district descriptive datasets.

13. The system of claim 12, wherein the user interface connects to the system platform via the internet.

14. The system of claim 12, wherein the user interface connects to the system platform via a wireless medium.

15. The system of claim 12, wherein the system resides as a stand-alone entity.

16. The system of claim 12, wherein the computer program manages the messaging capabilities such as notification to users and email via the RSS/Mail Server 850.

17. The system of claim 16, wherein the notifications to users are accessed via a wireless medium.

18. The system of claim 12, wherein the system platform includes a user interface for generating curriculum content demand data using the book and other curriculum content data, book selection data by institution, geographic data and student population data via a wireless medium.

19. The system of claim 12, wherein the system platform facilitates use of the user interface to link data via the internet and process a user's proprietary inventory, production, and distribution data.

20. The system of claim 12, wherein the book and other curriculum content data originates from individual users who access the system.

* * * * *